US006338596B1

(12) United States Patent
Galeazzi et al.

(10) Patent No.: US 6,338,596 B1
(45) Date of Patent: Jan. 15, 2002

(54) WASTE COLLECTION DEVICE

(76) Inventors: Carlo Galeazzi, 46049 Volta Mantovana, Via Roma 144; Gianpietro Galeazzi, 46049 Volta Mantovana, Via 1848, 37, both of (IT)

( * ) Notice: Subject to any disclaimer, the term of this patent is extended or adjusted under 35 U.S.C. 154(b) by 0 days.

(21) Appl. No.: 09/492,748

(22) Filed: Jan. 27, 2000

(30) Foreign Application Priority Data

Feb. 1, 1999 (IT) ....................................... MN99A0005

(51) Int. Cl.[7] ............................ B09B 1/00; E02D 27/32

(52) U.S. Cl. ....................... 405/129.5; 52/67; 52/169.6; 220/484; 405/129.6; 588/249; 588/260; 588/900

(58) Field of Search ............................... 49/49; 52/6, 7, 52/67, 169.6; 220/484; 404/2, 11; 405/3, 52, 53, 54, 129.1, 129.5, 129.6, 303; 588/249, 259, 260, 900

(56) References Cited

U.S. PATENT DOCUMENTS 2,528,056 A * 10/1950 Henry ........................ 220/484
4,489,810 A * 12/1984 Curtis .................. 52/169.6 X
5,140,786 A * 8/1992 Galeazzi et al. ....... 52/169.6 X
5,365,704 A * 11/1994 Ray ........................... 52/6 X
5,372,453 A * 12/1994 Argandona .................. 405/52
5,490,355 A * 2/1996 Galeazzi et al. ....... 52/169.6 X
5,523,519 A * 6/1996 Weber et al. ............... 588/249
5,573,085 A * 11/1996 Galeazzi et al. ........ 220/484 X
5,974,743 A * 11/1999 Vaia .......................... 52/169.6
RE36,971 E * 11/2000 Stokoe et al. .................. 405/3

FOREIGN PATENT DOCUMENTS

| | | |
|---|---|---|
| EP | 0 480 326 | 4/1992 |
| EP | 0 628 499 | 12/1994 |
| FR | 2 748 006 | 10/1997 |

* cited by examiner

*Primary Examiner*—George Suchfield
(74) *Attorney, Agent, or Firm*—Guido Modiano; Albert Josif; Daniel O'Byrne

(57) ABSTRACT

A waste collection device which comprises, inside a pit, a plate for supporting at least one container; the plate is provided with supports adapted to limit its downward motion to a minimum elevation which allows the container to lie fully within the pit; a monolithic structure, with a base and a lid provided with waste insertion pillars, the base and the lid being spaced so that when the lid is at the level of the paving that surrounds the pit the base lies at a lower level than the supporting plate; the structure is provided with movement device.

9 Claims, 2 Drawing Sheets

WASTE COLLECTION DEVICE

BACKGROUND OF THE INVENTION

The invention relates to a waste collection device.

It is known that one of the systems currently used to collect waste, particularly municipal waste, provides for containers inserted in pits formed in the road paving and provided with means for moving from a position in which they are retracted into the pit to a position in which they protrude from said pit.

When a container is inserted in the pit, the inlet of the pit is closed by means of a lid which lies above the container and is provided with at least one hollow pillar in which users place the bags of waste, which fall into the underlying container.

Said container is periodically removed from the pit in order to be emptied.

SUMMARY OF THE INVENTION

The aim of the present invention is to make devices of the above described type particularly effective.

This aim is achieved by a waste collection device according to the invention, characterized in that it comprises, inside a pit:

a plate for supporting at least one waste container, said plate being provided with means which are adapted to limit its downward motion to a minimum elevation which allows said container to lie fully within said pit;

a monolithic structure, which comprises a base and a lid which are vertically spaced so that when the lid is at the level of the paving that surrounds the pit the base lies at a lower level than the plate that supports the at least one container at the minimum elevation, said base being adapted to make contact with the lower surface of said plate, said lid being provided with at least one pillar for introducing waste, said monolithic structure that comprises the base and the lid being provided with means which are adapted to produce its vertical translatory motion between a lower stroke limit, at which said lid is at the level of the paving that surrounds the pit, and an upper stroke limit, at which the plate that supports the at least one container rested on said base is at said level.

BRIEF DESCRIPTION OF THE DRAWINGS

Further characteristics and advantages will become apparent from the description of a preferred but not exclusive embodiment of the invention, illustrated only by way of non-limitative example in the accompanying drawings, wherein.

DESCRIPTION OF THE PREFERRED EMBODIMENTS

Figure 1:
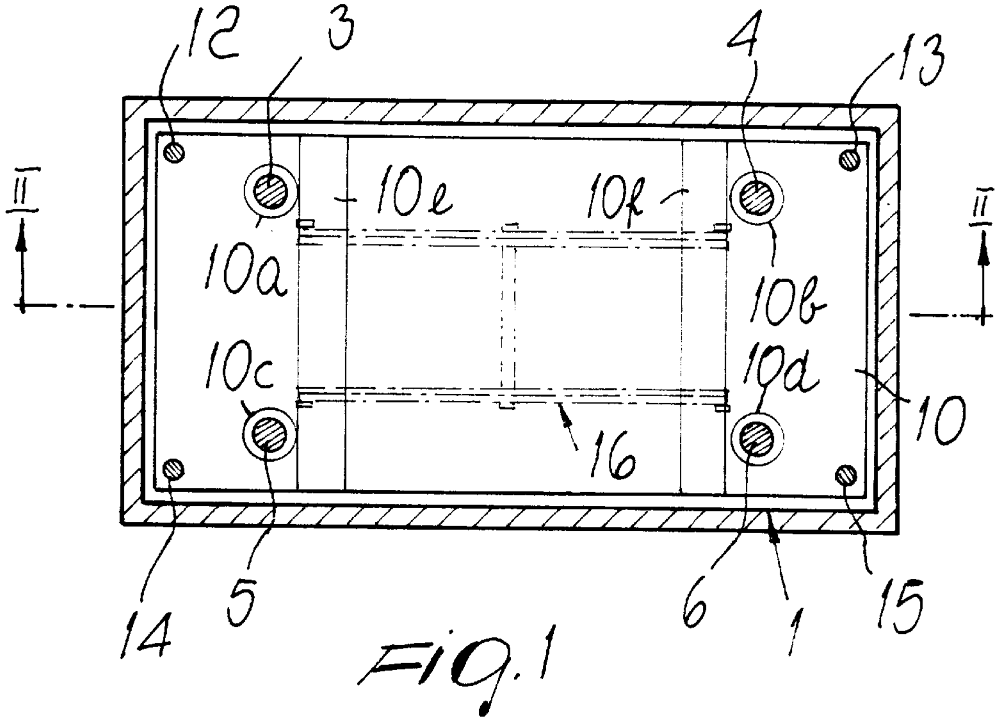
FIG. 1 is a sectional plan view of the invention, taken along the plane I—I of FIG. 2.

With reference to the above Figures, the numeral 1 generally designates the pit formed in the road paving 2 to contain the device, and proximate to the bottom of said pit there is a weighing device; the Figures show the posts 3, 4, 5, 6 of said device, which support sensors, such as 3*a*, 4*a* for the posts 3 and 4, which are adapted to accommodate, so that it rests on them, the plate 7 for supporting the waste container 8 and are connected to means for detecting the weight of said container.

Figure 2:
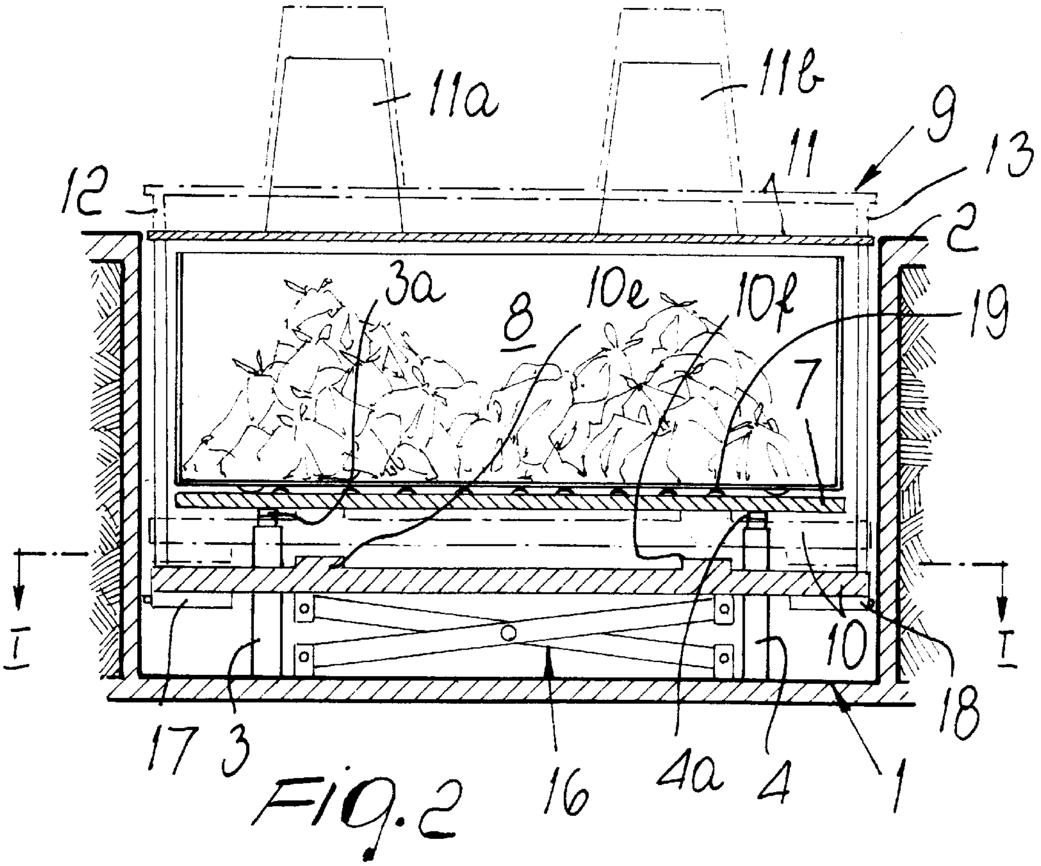
FIGS. 2 and 3 are sectional views, taken along the plane II—II of FIG. 1, in different steps of operation.

As clearly shown in FIG. 2, the sensors on the four posts are arranged so as to block the plate 7 at a minimum elevation which allows the container 8 to lie entirely within the pit 1 when the plate 7 rests thereon.

The numeral 9 furthermore generally designates a monolithic structure which comprises the base 10 and the lid 11, which are connected by means of the posts 12, 13, 14 and 15, whose length is such that, as clearly shown in FIG. 2, when the lid 11 is at the level of the paving 2 that surrounds the pit the base 10 is arranged at a level which is lower, by an extent which is specified in the operating description, than the minimum level of the plate 7 that supports the container 8 so that it rests on the sensors, such as 3*a*, 4*a*, of the weighing device.

Figure 3:
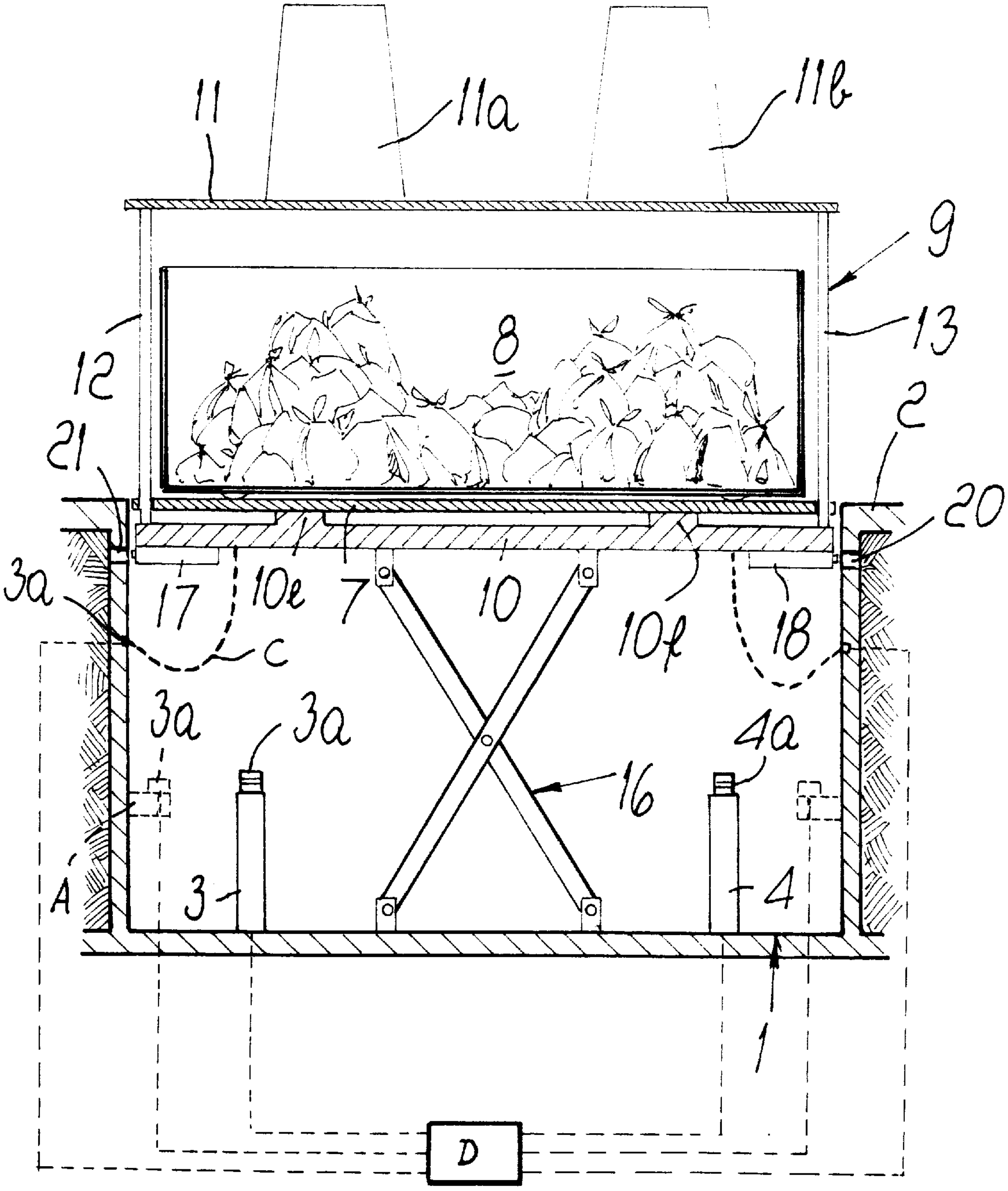

The base 10, which is provided with the holes 10*a*, 10*b*, 10*c*, 10*d* for the passage of the posts 3, 4, 5, 6, comprises the cross-members 10*e* and 10*f*, which allow it to make contact with the lower surface of the plate 7; the lid 11 is provided with the pillars 11*a*, 11*b* for inserting the waste; and finally, the monolithic structure 9 is provided with means which comprise the pantograph 16 and are adapted to produce its vertical movement between the position shown in solid lines in FIG. 2 and the position shown in FIG. 3, as will become apparent during the description of the operation.

Finally, the reference numerals 17 and 18 designate elements of a safety device for preventing the accidental fall of the structure 9 inside the pit 1, which comprises abutments provided with means for moving from a position which lies within the base 10 to a position for insertion in seats 21 which are formed in the walls of the pit and shown in FIG. 3.

The operation of the invention is now described starting from the situation shown in solid lines in FIG. 2, which is the situation of normal use: the plate 7 rests on the sensors, such as 3*a*, 4*a*, of the weighing device, with the waste container 8 arranged within the pit 1, and the monolithic structure 9 is at its lower stroke limit, with the lid 11 at the level of the surrounding paving 2 and the base 10 at a lower level than the plate 7, which rests on the sensors; users gradually introduce the waste bags in the pillars 11*a*, 11*b* and the weight of the container 8 that receives said bags is recorded continuously by data acquisition means D (FIG. 3) through the appropriately provided weighing device by virtue of the pulses that arrive from the sensors such as 3*a*, 4*a*.

When it is necessary to empty the container 8, the means for moving the monolithic structure 9 are actuated, producing a first portion of the stroke, up to the condition shown in dot-and-dash lines in FIG. 2, in which the base 10 has made contact with the lower surface of the plate 7 for supporting said container 8.

The length of this portion of the stroke, during which only the monolithic structure 9 moves while the container 8 is static, is calculated so as to allow to completely empty into said container the pillars 11*a*, 11*b*, which, when the container is full,, are clogged by the last bags to be introduced, by virtue of their rise with respect to said container 8, thus providing a functional condition which is absolutely essential for correct operation of the device.

The upward stroke of the monolithic structure 9 then continues to the upper stroke limit, shown in FIG. 3; this position allows handy extraction of the container 8 in order to empty it into a transport truck, optionally assisted by a roller platform 19 with which the plate 7 may be provided.

Nothing changes, of course, if a plurality bins is present instead of the single container 8.

The described invention is susceptible of numerous modifications and variations, all of which are within the scope of the appended claims; thus, for example, the weighing device can be omitted and the plate 7 for supporting the at least one waste container can be provided with means of any kind for downward blocking at the minimum elevation; instead of the illustrated posts there may be fixed abutments A which are rigidly coupled to the pit and are provided in any manner, but there may also be cables C which optionally comprise sensors 2*a,* 4*a* of a weighing device and are fixed to the walls of the pit at one end and to said plate 7 at the other end (see the schematic representation of FIG. 3).

The disclosures in Italian Patent Application No. MN99A000005 from which this application claims priority are incorporated herein by reference.

What is claimed is:

1. A waste collection device, comprising, inside a pit surrounded by paving:

a plate for supporting at least one waste container, said plate being provided with limit means for limiting downward motion thereof to a minimum elevation which allows said container to lie fully within said pit;

a monolithic structure, including a base and a lid which are vertically spaced so that when the lid is at the level of the paving that sounds the pit the base lies at a lower level than said plate that supports the at least one container at a minimum elevation, said base being arranged so as to make contact with a lower surface of said plate, said lid being provided with at least one pillar for introducing waste; and movement means connected to said base for producing vertical translatory motion thereof between a lower stroke limit, at which said lid is at the level of the paving that surrounds the pit, and an upper stroke limit, at which the plate that supports the at least one container tested on said base is at the level of the paving.

2. The device of claim 1, wherein said base and said lid are vertically spaced so that when the lid is at the level of the paving that surrounds the pit, the base is arranged at a level which, with respect to the plate that supports the at least one container and lies at the minimum elevation, is lower by an extent which allows complete emptying of the waste insertion pillars during the upward movement of said monolithic structure from the lower stroke limit before the base of said structure makes contact with the lower surface of the plate that sports the at least one waste container.

3. The device of claim 2, wherein said limit means comprise fixed abutments which are rigidly supported at selected regions of the pit.

4. The device of claim 2, wherein said limit means comprise cables which are fixed to walls of the pit at a first end and to said plate at a second end thereof.

5. The device of claim 3, further comprising a weighing device for weighing the at least one waste container.

6. The device of claim 5, wherein said weighing device comprises data acquisition means, and sensors which are associated with the fixed abutments for limiting the downward motion of the plate that supports the at least one waste container, said sensors receiving said plate to rest thereon for weighing and being connected to said data acquisition means.

7. The device of claim 4, further comprising a weighing device, said weighing device including data acquisition means, and sensors which are associated with the cables for limiting the downward motion of the plate that supports the at least one waste container, said sensors being connected to said data acquisition means.

8. The device of claim 6, wherein the plate for supporting the at least one waste container is provided with a roller platform.

9. The device of claim 6, including a safety device for preventing fall of said monolithic structure, said safety device comprising: abutments which are supported by any of the base of the monolithic structure and said plate that supports the at least one waste container, and lock seats formed in the wall of the pit, said abutments being provided with movable lock means for moving between a position which lies within a perimetral area of said base or said plate and a protruding position for insertion in said seats formed in the walls of the pit.

* * * * *